June 22, 1965   S. G. BENNER   3,190,736
ROTOR FOR THE FORMING OF GLASS FILAMENTS
Filed Aug. 21, 1962
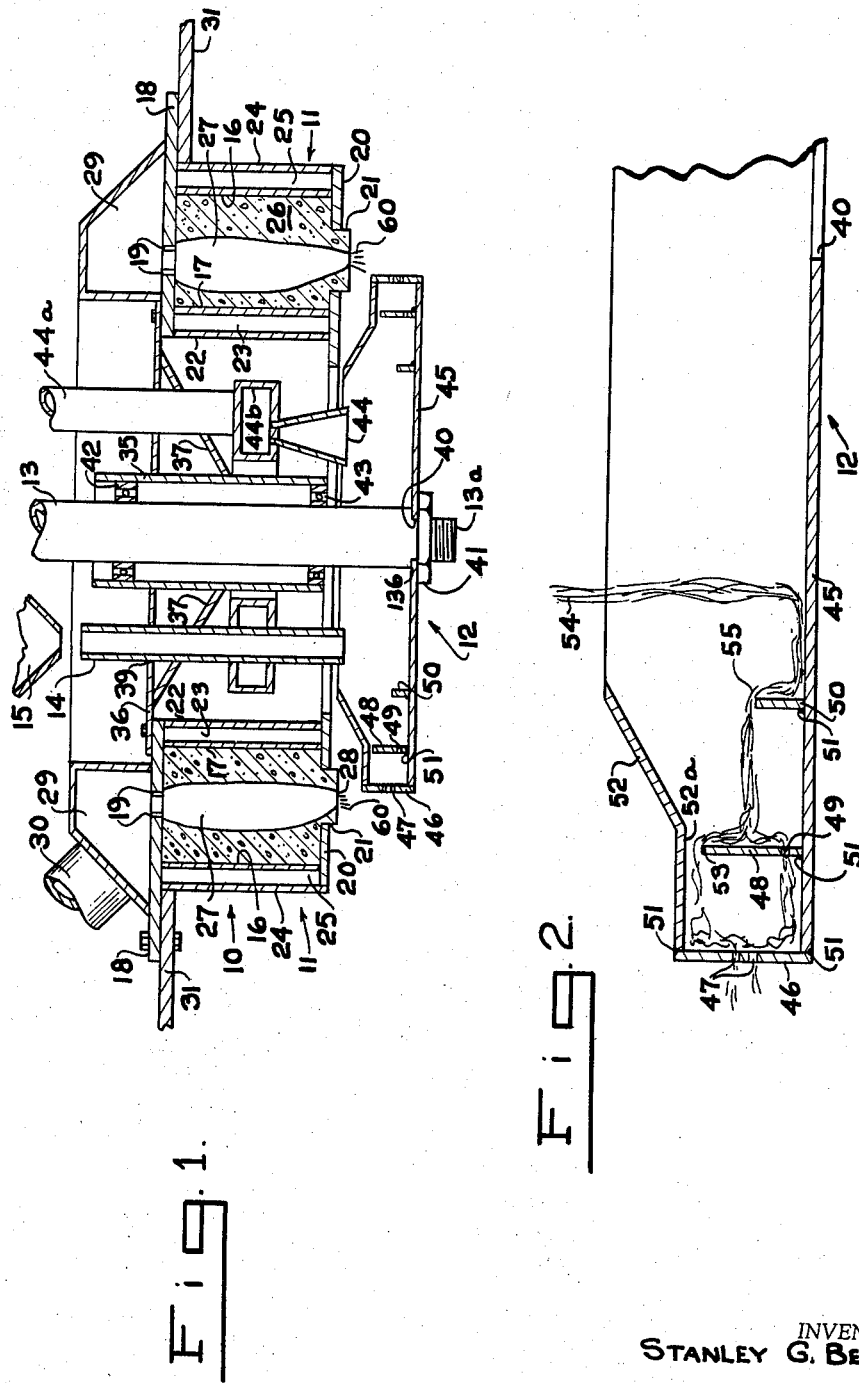
INVENTOR.
STANLEY G. BENNER
BY
ATTORNEY

United States Patent Office 3,190,736
Patented June 22, 1965

3,190,736
ROTOR FOR THE FORMING OF
GLASS FILAMENTS
Stanley G. Benner, South Plainfield, N.J., assignor to
Johns-Manville Corporation, New York, N.Y., a corporation of New York
Filed Aug. 21, 1962, Ser. No. 218,347
4 Claims. (Cl. 65—15)

This invention relates generally to the production of fibers and more particularly to the forming of glass fibers by the attenuation of centrifugally initiated filaments of molten glass. More specifically the instant invention relates to a disc or rotor for use in the centrifugal initiation of filaments of molten glass.

In the so-called rotary or centrifugal process for forming glass fibers, a molten stream of glass is deposited on a rapidly rotating rotor provided at its periphery with a rim having a plurality of openings formed therein through which the molten glass issues in the form of filaments. As the filaments issue from the openings at the rotor periphery, they are subjected to the action of a high velocity, high temperature gaseous blast to attenuate the filaments into fine diameter fibers. One of the difficulties encountered in this system for the formation of glass fibers relates to the proper loading of the rim so that proper amounts of molten glass are available for flowing through the openings in the rim. If the openings in the rim are unevenly loaded, then the filaments formed by the passage of the molten glass through the rim periphery will be of varying sizes so as to result in the formation of glass fibers having undesirable fiber diameters. Also, the wear or erosion on the openings in the rim becomes disproportionate and this materially shortens the life of the rotor. Also, this uneven wearing adds greatly to the formation of filaments of varying sizes including undesirable fiber diameters.

It is an object of the instant invention to provide an improved rotor for use in rotary fiber forming apparatus.

The foregoing object is accomplished in accordance with the instant invention by dividing the stream of molten glass before its deposition on the inner surface of the rim of the rotor so that substantially even amounts of molten glass are deposited on the inner peripheral surface of the rim at positions located axially on each side of the section of the rim containing the openings. The division of the molten glass prior to its deposition on the inner peripheral surface of the rim of the rotor is accomplished in accordance with the instant invention by an annular band secured to the base of the rotor and provided with means adjacent its axial extremities to allow the molten glass deposited thereon to move under the urging of the centrifugal forces generated by the rotating rotor toward the rim of the rotor in substantially two even amounts located axially on each side of the section of the rim having openings therein. In this manner, a more even loading of molten material is provided for the openings in the rim of the rotor so that glass fibers having a more uniform diameter may be produced.

The invention will be more fully understood and further objects and advantages thereof will become apparent when reference is made to the following detailed description of a preferred embodiment of the invention and the accompanying drawing in which:

FIG. 1 is a view in cross section of an apparatus constructed for use in accordance with the instant invention; and FIG. 2 is an enlarged view in cross section of a portion of the rotor of FIG. 1.

With reference now to the drawings and particularly to FIG. 1, there is shown suitable apparatus 10 for forming glass fibers by the rotary process. The apparatus 10 comprises a combustion housing indicated generally by the numeral 11, a rotor constructed in accordance with the present invention and indicated generally by the numeral 12, support shaft 13 for carrying the rotor, and an interior column 14 through which molten glass from a supply 15 is delivered to the rotor 12.

The combustion housing 11 is of generally circular configuration and is defined by generally cylindrical exterior wall 16 and inwardly spaced wall 17. At its uppermost end, the combustion chamber is closed by a generally annular ring shaped plate 18 suitably joined to walls 16 and 17. The plate 18 is provided with a plurality of openings 19 for a purpose to be described later. A generally annular ring shaped lower plate 20 is joined to the walls 16 and 17 at their lowermost extremities and has a generally annular opening 21 formed therein. A generally cylindrical inner wall 22 cooperates with the wall 17 to form a combustion chamber water jacket 23 and the wall 22 extends between and is joined to the upper and lower plates 18 and 20. Spaced outwardly from the wall 16 is a generally cylindrical wall 24, also joined to the upper and lower plates 18 and 20, and cooperating with the wall 16 to define a water jacket 25.

Between the walls 16 and 17, there is an inner refractory member 26 of ring-shaped configuration having a combustion chamber 27 which terminates in an annular opening 28 through which, as will be later described, hot products of combustion are emitted to attenuate glass filaments, projected from the rotor 12, into fibers. A combustible mixture of gases is fed into the combustion chamber 27 through the openings 19 which lead from a gas manifold 29 secured to the plate 18. A tube 30 introduces the gases under pressure to the manifold 29. Mounting means 31 are provided for holding the apparatus in the desired position.

The rotor 12 is supported beneath the combustion chamber 11 on the shaft 13 which is mounted in bearing tube 35 supported by a circular plate 36 which is connected to and supported by the upper plate 18 of the combustion housing 11. Additional supporting beams 37 cooperate to hold the bearing tube in position. The plate 36 is provided with an opening 39 therein for receiving and supporting the tube 14 through which the molten glass, to be deposited on the rotor 12, is poured. At its lowermost end, the rotatable drive shaft 13 has a threaded portion 13a of reduced cross-sectional area to form a shoulder 13b. The portion 13a extends through an opening 40 provided at the rotational axis of the rotor 12 which is secured to the shaft 13 for rotation therewith by being clamped between the shoulder 13b and a suitable nut 41. The drive shaft 13 is spaced from and supported within the tube 35 by means of spaced bearings 42 and 43. The shaft 13 is driven by a suitable motor (not shown).

In the embodiment of the invention illustrated in FIGS. 1 and 2, the rotor 12 comprises a generally circular base 45 having a central opening 40. Secured to the base 45 adjacent the outer peripheral surface thereof is a first strip 46 having a plurality of openings 47 therein. This first strip 46 constitutes the rim of the rotor. Also, a second strip 48 having a plurality of openings 49 thereon is secured to the base 45 and is located between the central opening 40 and the first strip 46. A third strip 50 is secured to the base 45 and is located between the central opening 40 and the second strip 48. Each of the strips 46, 48 and 50 may be formed from flat sheets of metal which are then rolled to a generally cylindrical shape and secured to the base 45 by welding indicated generally at 51. A splatter and strength shield 52, comprising a sheet metal stamping, is secured to the peripheral strip 46 by welding. The inner surface 52a of the splatter shield 52 is spaced a predetermined distance from the free axial extremity 53 of the strip 48 for a purpose to be described.

In order to maintain the molten glass at the desired viscosity after being deposited on the rotor 12, the instant apparatus provides suitable heating means comprising a plurality of burners 44 provided with combustibles and comburents through the tube 44a and annular housing 44b.

The strips 46, 48 and 50 in their cylindrical form are secured to the base 45 and proportioned so that the molten material deposited on the base 45 and radially within the strip 50 will follow a predetermined path. The strip 50 is secured to the base 45 and extends therefrom in an axial direction a distance equal to approximately one-half the axial extent of the strip 48. The strip 46 is secured to the base 45 and extends therefrom in an axial direction for a distance greater than the axial extent of the strip 48. The openings 47 in the strip 46 are located a distance from the base 45 less than the axial extent of the strip 48. The openings 49 in the strip 48 are located a distance from the base 45 in an axial direction less than the axial location of the openings 47.

In operation of the apparatus illustrated in FIGS. 1 and 2, molten glass from a supply 15 is fed through the column 14 onto the base 45 of the rotor 12 which is being rotated at a speed of about 2000 r.p.m. by appropriate means (not shown). In the embodiment illustrated in FIGS. 1 and 2, there is illustrated only the deposition of one stream of molten glass onto the base 45. However, it is within the scope of this invention to feed a plurality of streams of molten glass to the base 45 at locations spaced in an arcuate direction a desired distance apart so as to distribute the molten glass more evenly about the entire periphery of the rotor 12. Due to the centrifugal forces generated by the rapid rotation of the rotor 12, the molten glass is thrown radially outwardly across the face of the base 45 against the inner peripheral surface of the strip 50. After striking the lower portion of the strip 50, the glass spreads radially from the impact points and forms a thin layer adjacent the juncture of the strip 50 and the base 45. Due to the centrifugal force generated by the rotating rotor 12 and the constant supply of molten glass to the rotor 12, the molten glass is forced in an axial direction along the inner surface of the strip 50 in the form of a thin layer of molten glass and moves over the lip 55 presented by the free axial extremity of the strip 50. The molten glass flowing over the lip 55 is forced radially outwardly by the centrifugal forces generated by the rotation of the rotor 12 into contact with the inner peripheral surface of the strip 48. Since the strip 50 extends from the base 45 in an axial direction a distance equal to approximately one half the axial extent of the strip 48, the molten glass flowing over the lip 55 contacts the inner peripheral surface of the strip 48 approximately at the axial midpoint thereof. Due to the centrifugal force generated by the rotating rotor 12 and the constant supply of molten glass to the inner peripheral surface of the strip 48, the molten glass is forced in opposite axial directions along the inner surface of the strip 48. Because of the equal distribution of the centrifugal forces, the molten glass deposited on the inner peripheral surface of the strip 48 moves across the inner peripheral surface thereof in axial opposite directions as two streams of approximately equal amounts of molten glass with one stream flowing through the openings 49 in the strip 48 and the other stream flowing over the lip 53 of the strip 48. The one stream after passing through the openings 49 is forced into contact by the centrifugal forces generated by the rotating rotor 12 with the inner peripheral surface of the strip 46 and moves axially along the strip 46 until it passes out through the openings 47 as filaments of molten glass to be attenuated by the hot gaseous blast 60 from the combustion chamber 11. The other stream after passing over the lip 53 is forced into contact with the inner peripheral surface of the strip 46 between the openings 47 and the splatter shield 52 and moves axially along the strip 46 until it passes out through the openings 47 as filaments of molten glass to be attenuated by the hot gaseous blast 60. Thus, the openings 47 are supplied with even amounts of molten glass in accordance with the instant invention by having the two glass streams moving axially over the inner peripheral surface thereof from opposite directions toward the openings 47.

While the invention has been described in rather full detail, it will be understood that these details need not be strictly adhered to and that various changes and modifications may suggest themselves to one skilled in the art, all falling within the scope of the invention as defined by the subjoined claims.

What I claim is:

1. A rotor, for use in rotary systems of fiberization wherein a supply of molten material is deposited on the base of a rotor and urged by centrifugal force through openings in a peripheral wall of the rotor to produce filaments of molten material to be attenuated into fibers comprising:
    (a) a base having at least one broad surface area for receiving a supply of molten material,
    (b) means for rotating said base about an axis extending generally perpendicular to said broad surface area,
    (c) means connecting said base to said rotation means,
    (d) a first annular wall secured to said base and forming the peripheral wall thereof,
    (e) said peripheral wall having a plurality of openings therein at approximately the axially medial portion thereof and solid wall portions on each axial side of said medial portion,
    (f) means for depositing a supply of molten material onto the broad surface area of said base to be urged by centrifugal force in a radially outward direction,
    (g) means radially opposite said medial portion and connected to said rotor for rotation therewith for dividing said supply of molten material into a plurality of streams moving in a radially outward direction,
    (h) said dividing means spacing said streams from each other in an axial direction a distance greater than the axial extent of said medial portion of said peripheral wall containing said openings so that said radially moving streams are intercepted by the solid portion of said peripheral wall to form layers of molten material axially spaced from said medial portion from which portions thereof move axially over the inner peripheral surface of said peripheral wall from opposite directions toward said openings therein.

2. A rotor, for use in rotary systems of fiberization wherein a supply of molten material is deposited on the base of a rotor and urged by centrifugal force through openings in a peripheral wall of the rotor to produce filaments of molten material to be attenuated into fibers comprising:
    (a) a base having at least one broad surface area for receiving a supply of molten material,
    (b) means for rotating said base about an axis extending generally perpendicular to said broad surface area,
    (c) means connecting said base to said rotation means,
    (d) a first annular wall secured to said base and forming the peripheral wall thereof,
    (e) said peripheral wall having a plurality of openings therein at approximately the axially medial portion thereof and solid wall portions on each axial side of said medial portion,
    (f) means for depositing a supply of molten material onto the broad surface area of said base to be urged by centrifugal force in a radially outward direction,
    (g) means radially opposite said medial portion and connected to said rotor for rotation therewith for dividing said supply of molten material into two streams moving in a radially outward direction, (h) said dividing means spacing said streams from each other in an axial direction a distance greater than the axial extent of said medial portion of said peripheral wall containing said openings so that said radially moving streams are intercepted by the solid portion of said peripheral wall to form layers of molten material axially spaced from said medial portion from which portions thereof move axially over the inner peripheral surface of said peripheral wall from opposite directions toward said openings therein.

3. A rotor as defined in claim 2 wherein said means for dividing said supply of molten glass into two streams comprises:
   (a) a second annular wall secured to said base and having a plurality of openings therein immediately adjacent said base,
   (b) said second annular wall extending in an axial direction a distance less than the axial extent of said first annular wall and having a circumferential extent less than the circumferential extent of said first annular wall,
   (c) said second annular wall having a rim defined by the axial extremity thereof remote from said base, and
   (d) means for depositing said supply of molten material onto the inner peripheral surface of said second annular wall so that said molten material will flow over said inner peripheral surface of said second annular wall in opposite axial directions and radially outwardly therefrom through said openings and over said rim under the urging of said centrifugal force.

4. A rotor as defined in claim 3 wherein said means for depositing said supply of molten material onto the inner peripheral surface of the second annular wall comprises:
   (a) a third annular wall secured to said base,
   (b) said third annular wall extending in an axial direction a distance equal to approximately one half the axial extent of the second annular wall,
   (c) said third annular wall having a rim defined by the axial extremity thereof remote from said base, and
   (d) said molten material flowing over said rim of said third annular wall to be deposited on the inner peripheral surface of said second annular wall at approximately the axially medial portion thereof.

References Cited by the Examiner

UNITED STATES PATENTS

| 2,998,620 | 9/61 | Stalego | 65—14 X |
| 3,007,196 | 11/61 | Levecque et al. | 65—15 |
| 3,026,563 | 3/62 | Slayter et al. | 65—14 |

FOREIGN PATENTS

| 874,388 | 8/61 | Great Britain. |

DONALL H. SYLVESTER, *Primary Examiner.*